(12) United States Patent
Suzuki et al.

(10) Patent No.: US 6,461,263 B2
(45) Date of Patent: Oct. 8, 2002

(54) SILENT CHAIN DRIVE MECHANISM

(75) Inventors: Kenshi Suzuki, Osaka (JP); Masatoshi Sonoda, Osaka (JP); Hiroshi Horie, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/750,983

(22) Filed: Dec. 28, 2000

(65) Prior Publication Data
US 2001/0007842 A1 Jul. 12, 2001

(30) Foreign Application Priority Data
Jan. 12, 2000 (JP) .................................................. 003816

(51) Int. Cl.[7] ............................................. F16G 13/04
(52) U.S. Cl. ....................................................... 474/213
(58) Field of Search ................................. 474/155, 212, 474/213, 214, 215, 216, 217, 229

(56) References Cited
FOREIGN PATENT DOCUMENTS

| GB | 2 347 190 A | 8/2000 |
| JP | 8-184348 | 7/1996 |
| JP | 11-182635 | 7/1999 |

Primary Examiner—David A. Bucci
Assistant Examiner—Vicky A. Johnson
(74) Attorney, Agent, or Firm—Howson & Howson

(57) ABSTRACT

A silent chain drive mechanism includes a silent chain for transmitting power between a larger sprocket and a smaller sprocket, wherein the inside flanks of one link plate of the silent chain are profiled to project outward of the outside flanks of the adjacent link plates, and tooth flank configurations of the larger and smaller sprockets are formed by involute curves arranged to satisfy the expression $A1 > Ac \geq A2$, where $A1$ is a pressure angle of the smaller sprocket, $A2$ is a pressure angle of the larger sprocket, and $Ac$ is a pressure angle of the inside flanks of teeth of the link plates. With this arrangement, the chordal action of the silent chain is suppressed at both the larger sprocket side and the smaller sprocket side, thereby reducing vibrations and noises accompanied with the chordal action and improving the driving performance and durability.

4 Claims, 11 Drawing Sheets

SILENT CHAIN DRIVE MECHANISM

BACKGROUND OF THE INVENTION

The present invention relates to a silent chain drive mechanism for transmitting power between sprockets with different numbers of teeth as achieved when driving camshafts from a crankshaft of a four-stroke engine.

In a four-stroke engine shown in FIG. 6 hereof, a silent chain drive mechanism used for driving camshafts from a crankshaft has two sprockets 11a, 11a on the camshafts side for operating intake valves and exhaust valves, respectively, a sprocket 11b on the crankshaft side, a silent chain S for transmitting power between the crankshaft sprocket 11b and the camshaft sprockets 11a, a tensioner T for applying tension to the silent chain S, a tensioner lever L, and a chain guide G for suppressing run-out of the silent chain S.

The intake and exhaust valves are designed to complete a single cycle of operation while the crankshaft sprocket 11b makes two revolutions. Thus, the rotational speed of the crankshaft sprocket 11b must be reduced to half at the camshafts. To this end, the number of teeth of each of the camshaft sprockets 11a is twice the number of teeth of the crankshaft sprocket 11b.

The silent chain S used in such silent chain drive mechanism is exemplified in Japanese Patent Laid-open Publication No. Hei-8-184348, which includes, as shown in FIGS. 7 and 8 hereof, a series of longitudinally overlapping link plates 13 (three, 13a, 13b and 13c, being shown) having teeth adapted to mesh with a sprocket (not shown). When the chain is stretched substantially straight, rectilinearly profiled outside flanks 15 of the respective link plates 13a–13c form a series of teeth having a trapezoidal profile.

In one specific form of the exemplified silent chain, when the silent chain is stretched substantially straight as shown in FIG. 7, inside flanks 16 of one link plate 13b are retracted from the outside flanks 15 of the adjacent link plates 13a, 13c. In another specific form of the exemplified silent chain as shown in FIG. 8, when the silent chain is stretched substantially straight, barreled or convexly arcuate inside flanks 16a of one link plate 13b project outward of the outside flanks 15 of the adjacent link plates 13a, 13c.

The crankshaft sprocket 11b and the camshaft sprockets 11a are formed by a sprocket tooth hobbing process, such as shown in FIG. 9 hereof and described in Japanese Patent Application No. Hei-1-037745. In the hobbing process, a hob cutter with teeth having a profile similar to that of a series of trapezoidal teeth formed by the outside flanks 15 of the longitudinally overlapping link plates 13 described previously is used. The hob cutter cuts the periphery of a cylindrical workpiece with an amount of addendum modification set in such a manner that the silent chain, as it is wrapped around the sprocket, forms an equilateral polygon with one side equal in length to a pitch P of the silent chain. Thus, an involute tooth form is produced.

In the case where sprockets with different numbers of teeth are to be formed to achieve a reduction gear ratio of 1:2, the crankshaft sprocket 11b and the camshaft sprocket 11a are both cut or hobbed by using a hob cutter profiled to have a pressure angle Ah equal to the pressure angle Af defined by the outside flanks of the silent chain. As an alternative, in order to avoid undercut or root thinning caused by the number of teeth of the crankshaft sprocket 11b which is half the number of teeth of the camshaft sprocket 11a, teeth of the crankshaft sprocket 11b are cut by using a hob cutter having a pressure angle larger than the pressure angle Af of the outside flanks 15 of the silent chain.

Thus, the tooth flank configurations of the camshaft sprocket 11a and crankshaft sprocket 11b are formed by involute curves arranged to satisfy the expression $$A2 \geq A1 = Af$$

where A1 is the pressure angle of the camshaft sprocket 11a, A2 is the pressure angle of the crankshaft sprocket 11b, and Af is the pressure angle defined by the outside flanks 15 of the link plates.

A silent chain drive mechanism comprised of the above silent chain S, camshaft sprockets 11a and crankshaft sprocket 11b for driving the camshafts exhibits a meshing condition shown in FIGS. 10 and 11.

First, consider a silent chain S having link plates whose inside flanks are retracted from the outside flanks of the adjacent link plates when the silent chain is stretched substantially straight as shown in FIG. 7. When such silent chain S is wrapped around the sprocket 11 (11a, 11b), the outside flanks 15 of the link plates 13 are seated on the tooth flanks of every other sprocket tooth to assume meshing with the sprocket 11 in a polygonal fashion, while the inside flanks 16 of the link plates 13 do not interfere with the tooth flanks of either of the camshaft sprockets 11a and the crankshaft sprocket 11b because they are retracted from the outside flanks.

However, since the link plates 13 of the above silent chain S mesh at their outside flanks 15 alone with the teeth of each sprocket 11a, 11b, the silent chain S makes, upon commencement of meshing, a polygonal motion involving up and down movements in a radial direction referring to the sprocket.

A quantitative analysis was made on the polygonal motion. As can be appreciated from FIG. 10, since a pitch angle θ of the teeth of the sprocket 11 and the number of teeth Z of the sprocket 11 have relations expressed by θ=(360°/Z), the following may be established.

First, when the chain pitch is P and a free span of the chain following the link plate 13b is positioned at a right angle to a line passing over the centers of the sprocket 11 and a connector pin 12a, as shown in FIG. 10, the distance from the center of the sprocket 11 to the connector pin 12a of the free span chain is determined by the height of the connector pin 12a from the center of sprocket 11 because of the outside flanks of the link plate 13a being seated on the tooth flanks of the sprocket 11, and thus expressed by U=P/2 sin(θ/2).

Next, as shown in FIG. 11, when the sprocket 11 is rotated a half pitch angle θ/2 from the position of FIG. 10 and the free span chain is positioned at a right angle to a line passing over the centers of the sprocket 11 and the link plate 13b, the distance from the center of the sprocket 11 to the chain pitch line of the free span chain is determined by the height of the connector pin 12a from the center of sprocket 11 because of the outside flanks of the link plate 13a being seated on the tooth flanks of the sprocket, and thus expressed by V=P/2 tan(θ/2). In FIGS. 10 and 11, the arrowhead indicates the direction of rotation of the sprocket 11, and the profiled arrow head indicates the direction of travel of the silent chain.

As can be readily appreciated from the above discussion, the silent chain S just started meshing engagement with the sprocket 11 makes a polygonal motion of amplitude Hs=U−V involving up and down movements during half pitch angle (θ/2) rotation of the sprocket 11. Thus, the silent chain S displays a so-called "chordal action".

Consequently, when the thus-arranged silent chain is used, the chordal action (polygonal motion) of amplitude Hs=U−V and associated up and down movements cause the outside flanks 15 of the link plates 13a, 13b, 13c to hit the tooth flanks of the sprocket 1, resulting in an undesired beating motion. In addition, when the silent chain drive mechanism is operated at a high speed, undesired vibratory and impact sounds are produced, which form a main source of vibrations and noises generated in the cam drive mechanism of a four-stroke engine.

Furthermore, the chordal action produced by the polygonal motion causes the tension of the chain to change, thereby deteriorating the durability of the silent chain.

Next, consider a silent chain S having link plates whose barreled inside flanks 16a project from the outside flanks 15 of the adjacent link plates when the silent chain is stretched substantially straight as shown in FIG. 8. When such silent chain S is wrapped around the sprocket 11, the outside flanks 15 of the link plates 13 are seated on the tooth flanks of every other sprocket tooth to assume meshing with the sprocket 11 in a polygonal fashion. In this instance, because the barreled inside flanks 16a project at their central portions from the outside flanks 15 of the adjacent link plates, the central portions of the barreled inside flanks 16a of the link plates in a free span chain engage the tooth flanks of the sprocket and temporarily lift up the free span chain before the outside flanks 15 of the link plates are seated on the sprocket tooth flanks, whereby the chordal action can be reduced as compared to the chordal action associated with the silent chain of FIG. 7.

However, since the crankshaft sprocket 11b and the camshaft sprockets 11a have different pitch angles ($\theta=360°/Z$) due to a great difference in the number of teeth, the polygonal motions of the silent chain occurring, respectively, at the crankshaft sprocket 1b and at the camshaft sprockets 1a greatly differ in magnitude from each other. When the above silent chain with link plates having barreled inside flanks 16a is used, the amount of lift of the free span chain is constant, so that the polygonal motion occurs necessarily at either of the two sprocket sides 11a, 11b. Thus, it becomes difficult to suppress both the chordal action occurring at the crankshaft sprocket and the chordal action occurring at the camshaft sprockets.

Accordingly, in such camshaft drive mechanism, even though the chordal action at one of the crankshaft sprocket and the camshaft sprockets can be suppressed, the crankshaft drive mechanism as a whole is still unsatisfactory in reducing vibrations and noises resulting from the chordal action. In addition, there arises a difficult problem that the barreled inside flanks 16a of the link plates hit the tooth flanks of the sprocket, thereby producing another sort of vibration and noise as well as the changes in the chain tension.

SUMMARY OF THE INVENTION

It is therefore an object of the present invention to provide a silent chain drive mechanism for transmitting power between sprockets with different numbers of teeth, as achieved when camshafts are driven by a crankshaft of a four-stroke engine via a silent chain, in which the chordal action of the silent chain is suppressed to reduce vibrational sounds and impact sounds caused by the chordal action, and the changes in the chain tension is suppressed, thereby to improve the driving performance and the durability of the silent chain drive mechanism.

To attain the above object, there is provided, in accordance with the present invention, a silent chain drive mechanism which comprises: a larger sprocket having a plurality of spaced teeth; a smaller sprocket having a plurality of spaced teeth smaller in number than the teeth of the larger sprocket; and a silent chain wound around the larger sprocket and the smaller sprocket for transmitting power therebetween, the silent chain comprising a plurality of link plates interconnected by connector pins, each link plate having a pair of teeth, the link plate teeth having inside and outside flanks being profiled to satisfy the expression $$Hc=Hf+Hs$$

where Hc is a distance from a pitch line of the chain to a pitch line of the inside flanks, Hf is a distance from the chain pitch line to a pitch line of the outside flanks, and Hs is an amplitude of a polygonal motion of the chain at a virtual sprocket having a plurality of spaced teeth set to be either equal in number to the teeth of the smaller sprocket or intermediate in number between the teeth of the smaller sprocket and the teeth of the larger sprocket, and the larger and smaller sprockets having respective tooth flanks being profiled by involute curves arranged to satisfy the expression $$A1>Ac \geq A2$$

where A1 is a pressure angle of the larger sprocket, A2 is a pressure angle of the smaller sprocket, and Ac is a pressure angle of the inside flanks of the link plate teeth of the silent chain.

The silent chain used in the silent chain drive mechanism of the present invention includes a number of intermeshed rows of link plates connected by connector pins such as round pins or rocker joint pins. Each of the link plates has a pair of teeth, and each link plate tooth has an outside flank forming an outer side of the tooth and an inside flank forming an inner side of the tooth.

It is preferable that the virtual sprocket has a pressure angle equal to the pressure angle of the inside flanks of the link plate teeth.

The term "chain pitch line" used herein represents a line interconnecting the centers of the connector pins of the link plate.

The term "inside flank pitch line" used herein represents a line passing parallel to the chain pitch line over the inside flank at points where the distance between these points becomes ½ of the chain pitch.

The term "outside flank pitch line" used herein represents a line passing parallel to the chain pitch line over the outside flank at points where the distance between these points becomes 3/2 of the chain pitch.

The term "amplitude of polygonal motion" used herein represents a distance of up and down movements in a radial direction of the sprocket, which the silent chain makes when the chain starts meshing at its outside flanks with the sprocket.

The term "pressure angle of sprocket" used herein represents a pressure angle of a tooth form of a hob cutter used to cut the teeth of the sprocket.

In the silent chain drive mechanism of the present invention, since the inside flanks of the link plate teeth are profiled to satisfy the above expression Hc=Hf+Hs, the inside flanks and the sprocket establish therebetween an intermeshing relation similar to that established between a rack and a pinion, in which the distance from the center of the sprocket to a free span of the chain is kept constant throughout the course of meshing of a link plate immediately before the free span chain, that is, from the start of meshing until seating on the sprocket of that link plate, thereby preventing the silent chain from exhibiting a chordal action resulting from the polygonal motion of the chain.

In other words, the chain polygonal motion can be suppressed by using link plates in which the inside flanks are profiled such that the inside flank pitch line is positioned farther from the chain pitch line than the outside flank pitch line by a distance corresponding to the amplitude Hs of the chain polygonal motion occurring at a virtual sprocket having teeth so set as to be either equal in number to the teeth of the smaller sprocket or intermediate in number between the teeth of the smaller sprocket and the teeth of the larger sprocket.

In the silent chain drive mechanism of the present invention, since the respective tooth flank configurations of the larger and smaller sprockets are formed by involute curves arranged to satisfy the above expression $A1 > Ac \geq A2$, even if the number of teeth of the larger sprocket is twice the number of teeth of the smaller sprocket, the silent chain starts meshing with the larger sprocket and the smaller sprocket such that the inside flank of a link plate immediately before the free span chain meshes with the sprocket concurrently with the outside flank of the preceding link plate being seated on the sprocket to thereby lift up and keep the free span chain at a level corresponding to a peak of the polygonal motion of the chain. The silent chain is thus prevented from exhibiting a chordal action at both the smaller sprocket and the larger sprocket.

BRIEF DESCRIPTION OF THE DRAWINGS

A preferred embodiment of the present invention will hereinafter be described in detail, by way of example only, with reference to the accompanying drawings, in which:

FIG. 3A is an enlarged view of a portion of FIG. 3;

DETAILED DESCRIPTION OF THE PREFERRED EMBODIMENT

The following description is merely exemplary in nature and is in no way intended to limit the invention or its application or uses.

Figure 3:
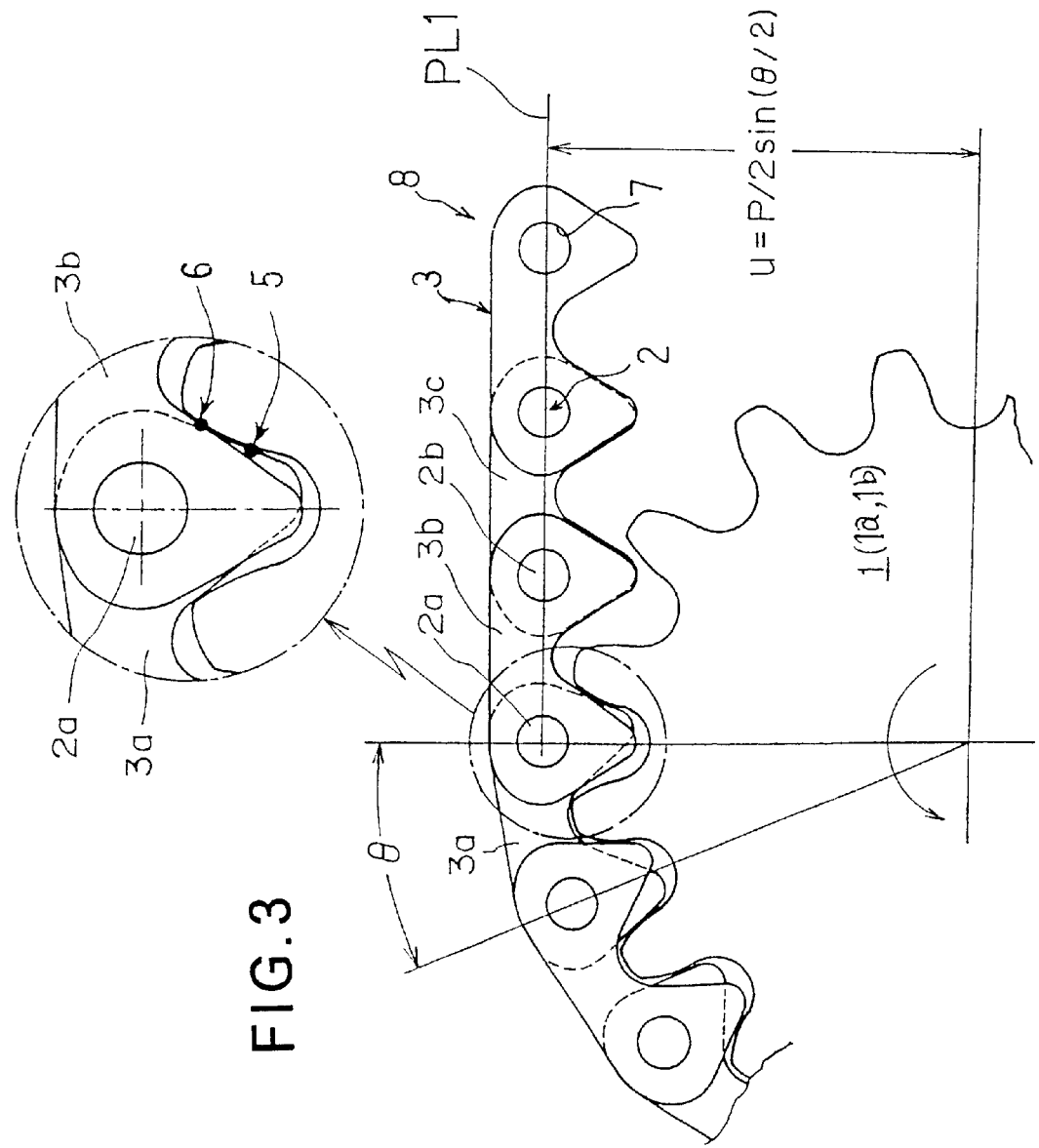
FIG. 3 schematically illustrates how the silent chain meshes with a sprocket according to the present invention.
Figure 6:
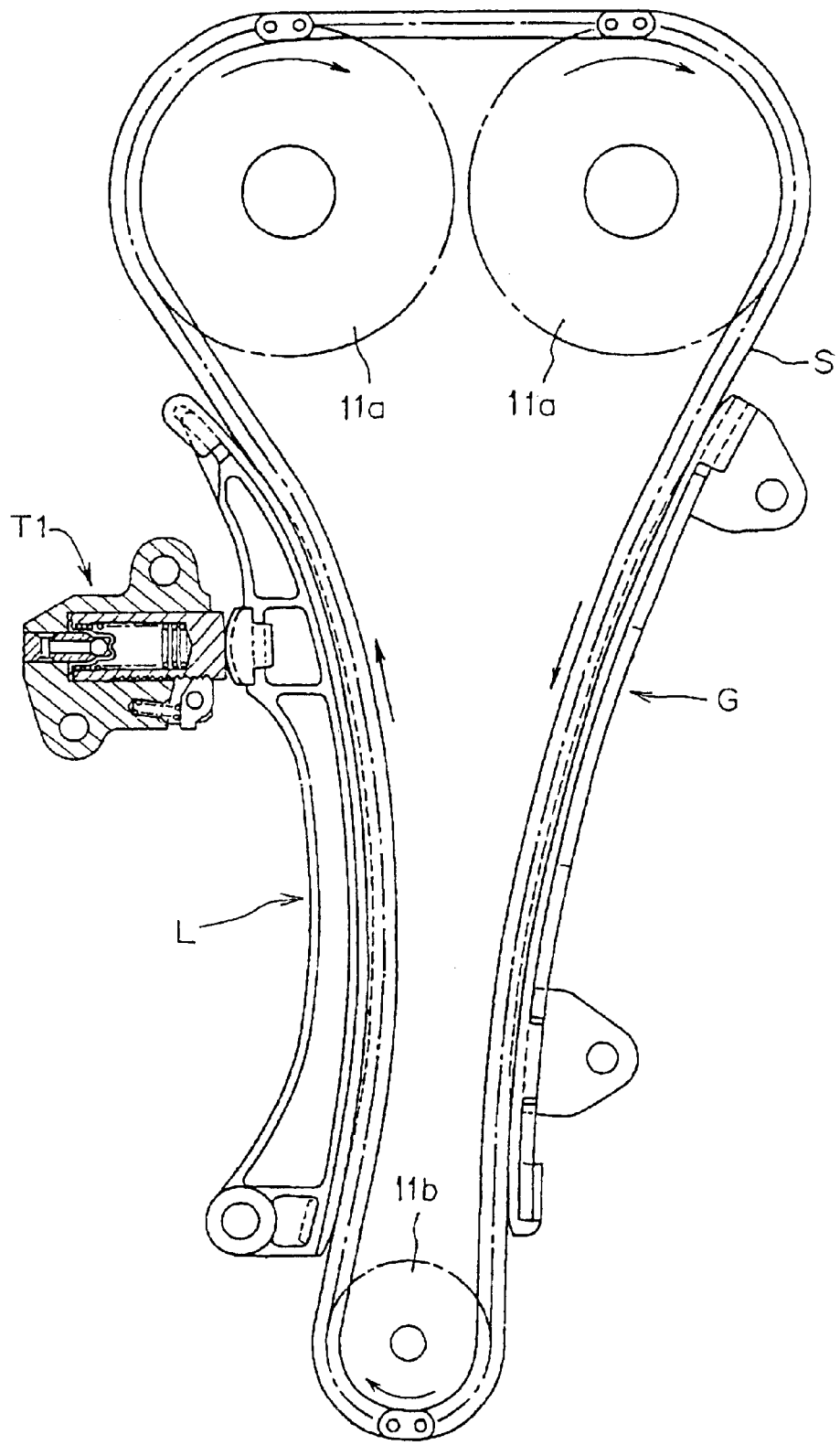
FIG. 6 is a diagrammatical view showing the general construction of a conventional silent chain drive mechanism.

Referring to FIG. 3, a silent chain drive mechanism according to the present invention comprises a silent chain 8 and a sprocket 1. The sprocket 1 constitutes a crankshaft sprocket 1b or each of a pair of camshaft sprockets 1a. The non-illustrated sprocket also forms part of the silent chain drive mechanism. The silent chain drive mechanism is a speed-reducing drive mechanism for driving intake and exhaust valves of an automobile engine to complete a single cycle of operation while a crankshaft makes two revolution in the same manner as done in the conventional mechanism shown in FIG. 6. The camshaft sprockets 1a have spaced teeth which is twice the number of the teeth of the crankshaft sprocket 1b.

The sprocket 1 (1a, 1b) has tooth flanks formed by an involute curve for meshing with link plate teeth of the silent chain 8.

Figure 2:
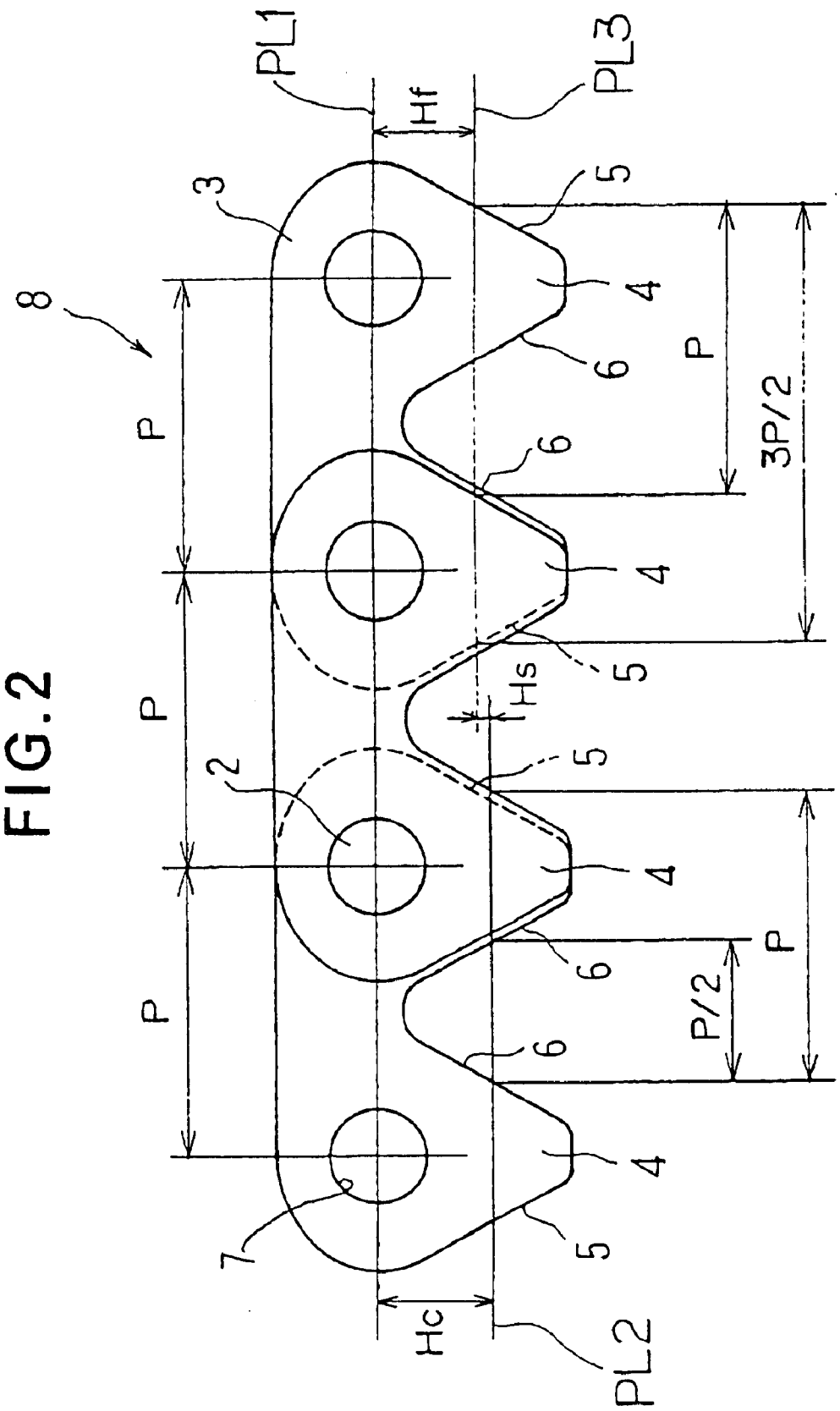
FIG. 2 schematically illustrates how the silent chain is arranged.

As shown in FIG. 2, the silent chain 8 comprises a plurality of link plates 3 interconnected by means of connector pins 2 fitted in apertures 7 formed therein. Each link plate 3 has a pair of teeth 4, outside flanks 5 forming the outer sides thereof, and inside flanks 6 forming the inner sides thereof.

The flanks 5, 6 forming the teeth of the link plates 3 are profiled to satisfy the expression $$Hc = Hf + Hs$$

where Hc is the distance from a chain pitch line PL1 to an inside flank pitch line PL2, Hf is the distance from the chain pitch line PL1 to an outside flank pitch line PL3, and Hs is an amplitude of the polygonal motion of the chain 8.

More concretely, the amplitude of the polygonal motion is calculated in a manner described below.

First, the number of teeth Zc of a virtual sprocket is set to a value between the number of teeth Z1 of the camshaft sprockets 1a and the number of teeth Z2 of the crankshaft sprocket 1b. Considering that the polygonal motion becomes greater as the number of teeth decreases, the value Zc is preferably set to be smaller than the mean value of Z1 and Z2 or equal to the number of teeth Z2 of the crankshaft sprocket 1b.

Next, the amplitude Hs of the polygonal motion of the chain 8 occurring with the virtual sprocket with the number of teeth Zc is determined.

As shown in FIG. 2, the link plates 3 employed in the silent chain 8 of the embodiment described herein have identical profiles. The outside flanks 5 and the inside flanks 6 have a rectilinear profile. Thus, the distance between each of the inside flanks 6 of one link plate 3 and the corresponding inside flank 6 of an adjacent link plate 3 is equal to the chain pitch P which is defined as the center distance between a pair of connector pins 2 of each link plate 3.

The number of teeth of the camshaft sprockets 1a is twice the number of teeth of the crankshaft sprocket 1b so that the rotational speed of the crankshaft 1b is reduced to half at the camshaft sprockets 1a.

The teeth of the sprockets 1a, 1b are formed by a sprocket teeth hobbing process using a hob cutter in which the distance from the center of each sprocket 1 (1a, 1b) to the chain pitch line PL1 is expressed by $U = P/2 \sin(\theta/2)$ in conjunction with the inside flanks 6 of the above silent chain 8.

In order to realize the above distance U, the respective tooth flanks of the camshaft sprockets 1a and the crankshaft sprocket 1a are profiled by involute curves arranged to satisfy the expression $$A1 > Ac \geq A2$$

where A1 is a pressure angle of the camshaft sprockets 1a, A2 is a pressure angle of the crankshaft sprocket 1b, and Ac is a pressure angle of the inside flanks 6 of the silent chain 8.

Figure 9:
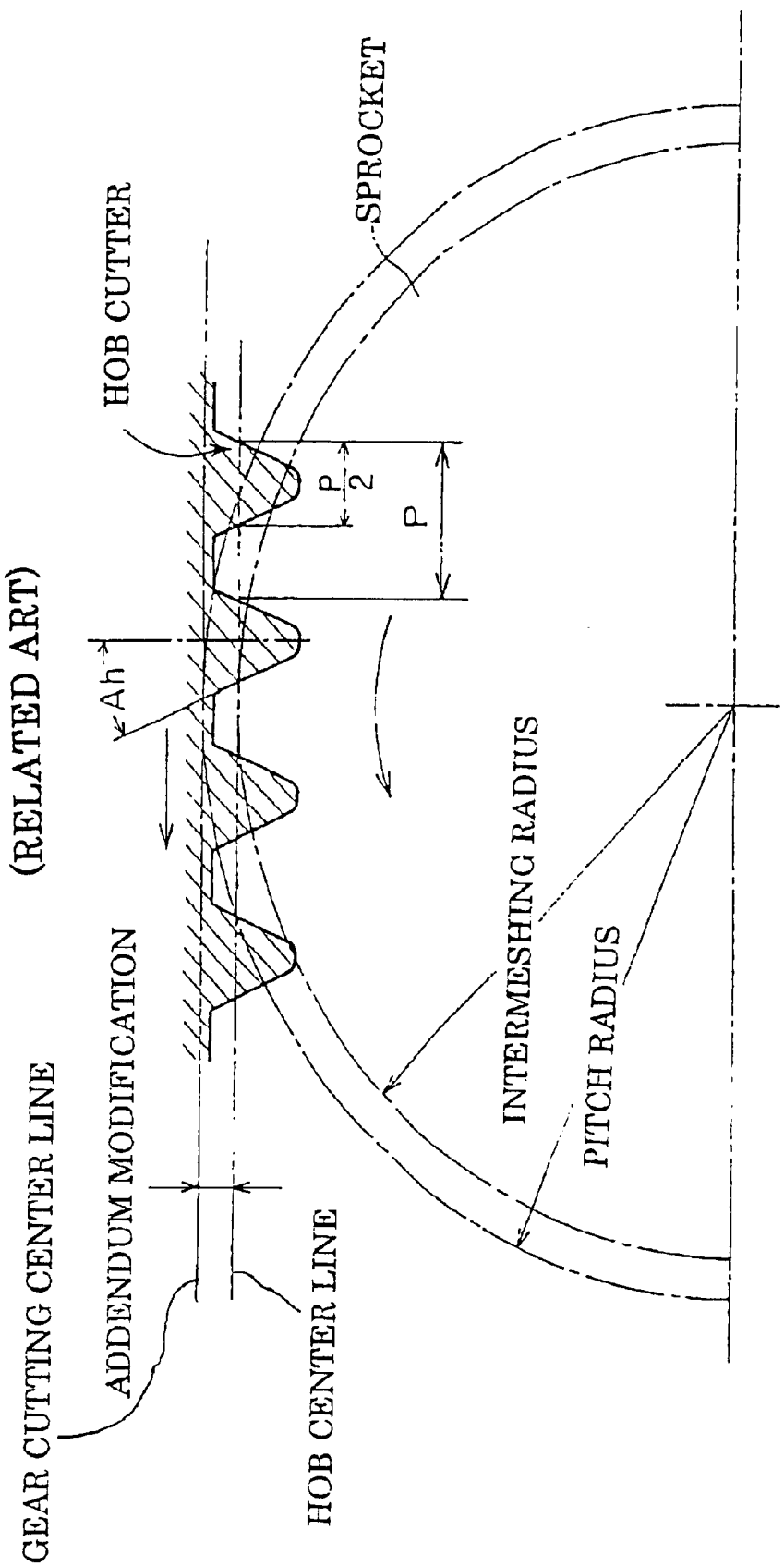
FIG. 9 is a schematic illustration of a conventional hobbing process in which teeth of the sprocket are formed.

The pressure angle A1 of the camshaft sprockets 1a and the pressure angle A2 of the crankshaft sprocket 1b can be set arbitrarily by a pressure angle Ah (FIG. 9) of the hob cutter.

More concretely, the pressure angle A1 of the camshaft sprockets 1a and the pressure angle A2 of the crankshaft sprocket 1b are calculated in a manner described below.

The pressure angle A1 of the camshaft sprockets 1a and the pressure angle A2 of the crankshaft sprocket 1b are determined on conditions that (1) when the right connector pin 2a of one link plate 3a being seated on the sprocket 1 is located directly above the center of the sprocket 1, the outside flank 5 of the seated link plate 3a and the advance-direction-side inside flank 6 of the following link plate 3b of a free span chain concurrently mesh with the same tooth of the sprocket 1, as shown on enlarged scale in FIG. 3A, and (2) the Hc value is kept constant even when the number of teeth Z1 of the camshaft sprockets 1a and the number of teeth Z2 of the crankshaft sprocket 1b are different from each other.

Figure 5:
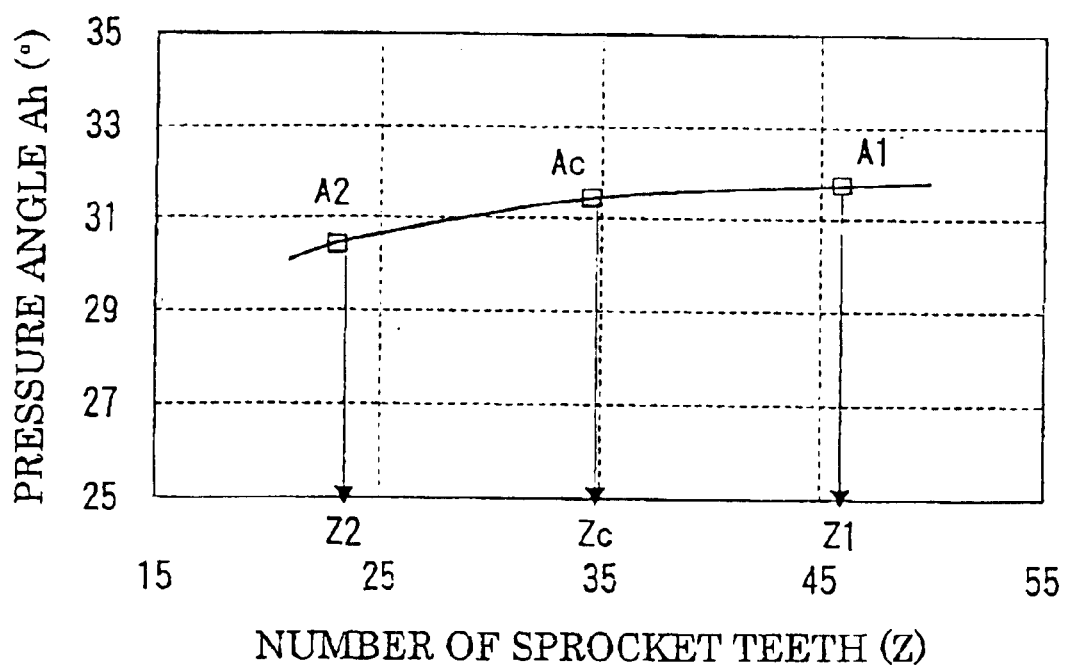
FIG. 5 is a graph showing the relationship between the pressure angle of the sprocket and the pressure angle of a hob cutter.

FIG. 5 is a graph showing the relationship between the number of sprocket Z and the pressure angle Ah of the hob cutter (namely, the pressure angles of the sprockets 1a, 1b) determined as discussed above. In the graph, the pressure angle of the virtual sprocket with the number of teeth Zc is identical to the pressure angle Ac of the inside flanks 6 of the silent chain 8.

It is apparent from FIG. 5 that the tooth flank configurations of the camshaft sprockets 1a and the crankshaft sprocket 1b are formed to satisfy the expression $$A1 > Ac \geq A2.$$

An operation of the silent chain drive mechanism will be discussed next with reference to FIGS. 3 and 4.

As shown in FIG. 3, the chain 8 is engaged with the sprocket 1 such that the pin 2a and a succeeding free span of the chain are right-angled with respect to a line passing over the center of the sprocket 1 and the pin 2a. The term "free span of the chain" used herein represents that part of the silent chain which is about to get engaged with the sprocket and is not yet seated on the latter. In this sense, the free span of the chain is not completely restrained by the sprocket and is kept relatively free.

Figure 10:
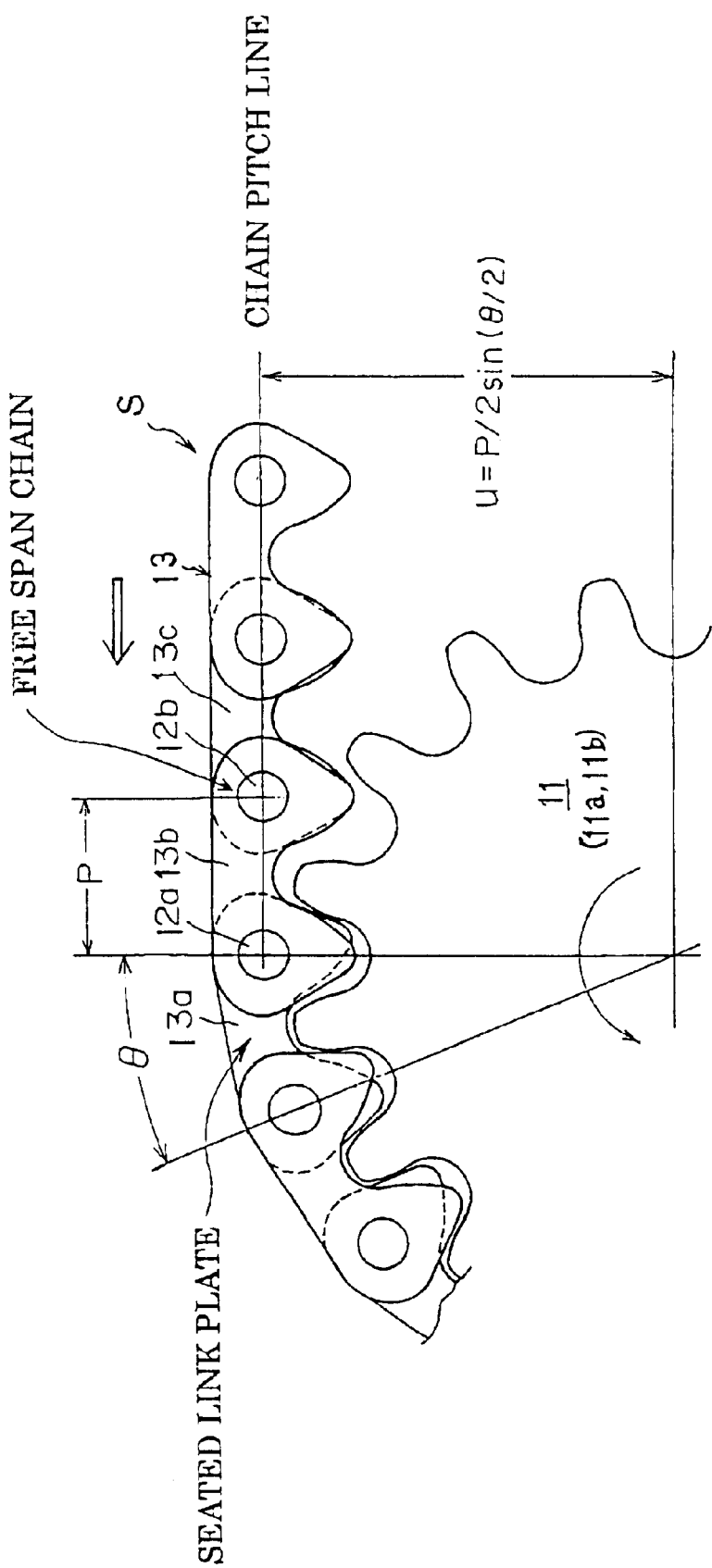
FIG. 10 is a schematic illustration of a meshing state in the conventional silent chain drive mechanism.

The link plate 3a meshes at its opposed outside flanks with the sprocket 1 and seated on the latter as in the conventional arrangement of FIG. 10. Thus, the distance from the center of the sprocket 1 to the pin 2a of the free span chain is expressed by $$U = P/2 \sin(\theta/2).$$

The free span chain including the link plate 3b and succeeding ones is pulled taut linearly by the tension of the silent chain 8, as shown in FIG. 3. At this time, the inside flank projects farther outward than the contour of the outside flank. Thus, when the sprocket 1 is assumed to be a pinion, the free span chain may be deemed a rack having teeth of trapezoidal profile formed by a multitude of inside flanks. In this sense, the free span chain and the sprocket 1 have meshing relations as found in ordinary rack-and-pinion mechanisms.

Figure 1:
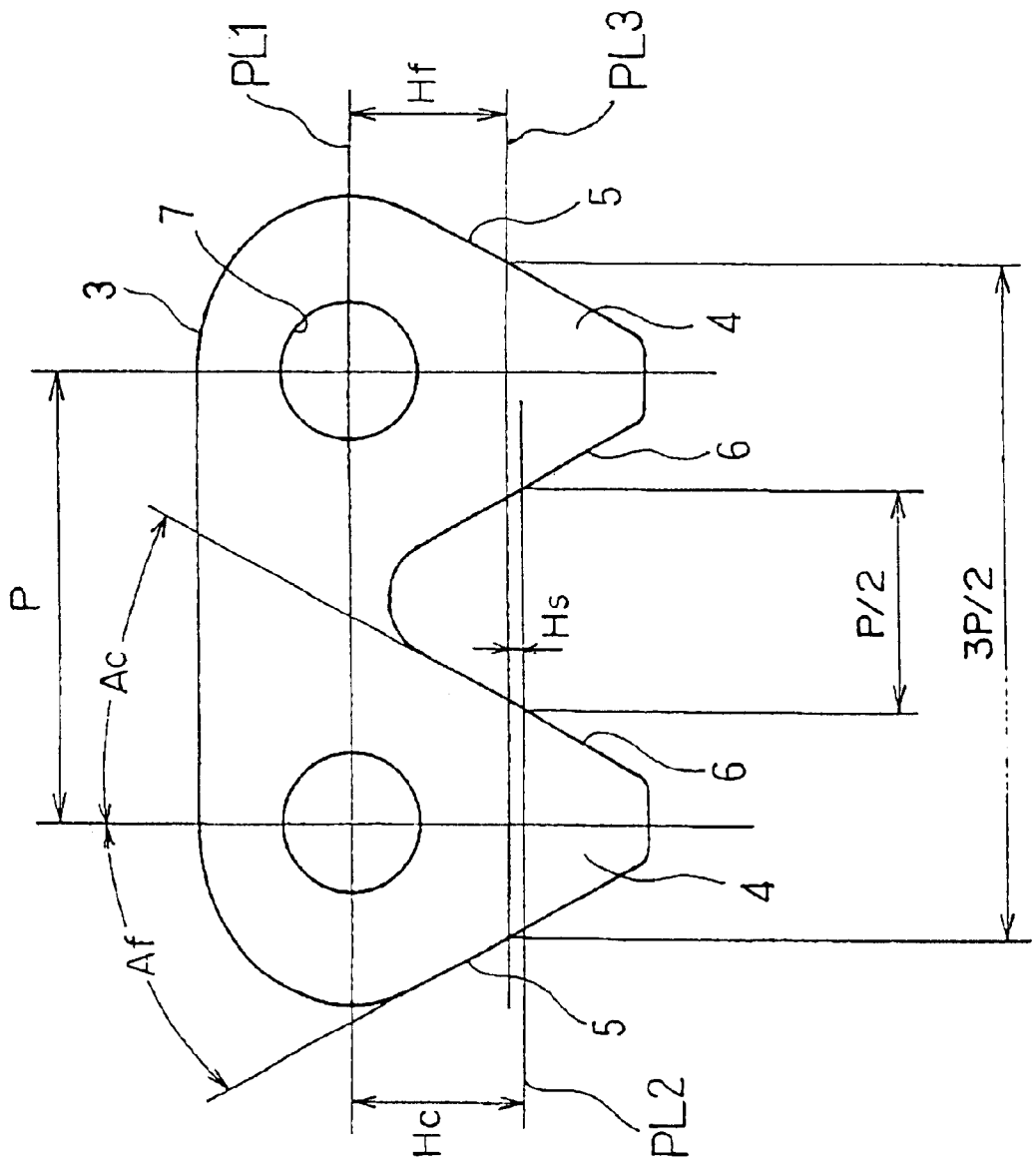
FIG. 1 is a schematic illustration of a link plate of a silent chain employed in a silent chain drive mechanism according to the present invention.

In this instance, the link plate 3b meshes at its advance-direction-side inside flank with the sprocket 1. The inside flank pitch line PL2 is positioned farther from the chain pitch line PL1 than the outside flank pitch line PL3 by the distance Hs (see FIG. 1). Thus, the distance from the center of the sprocket 1 to the chain pitch line PL1 of the link plate 3b of the free span chain becomes U as will be understood from the description given below.

Figure 4:
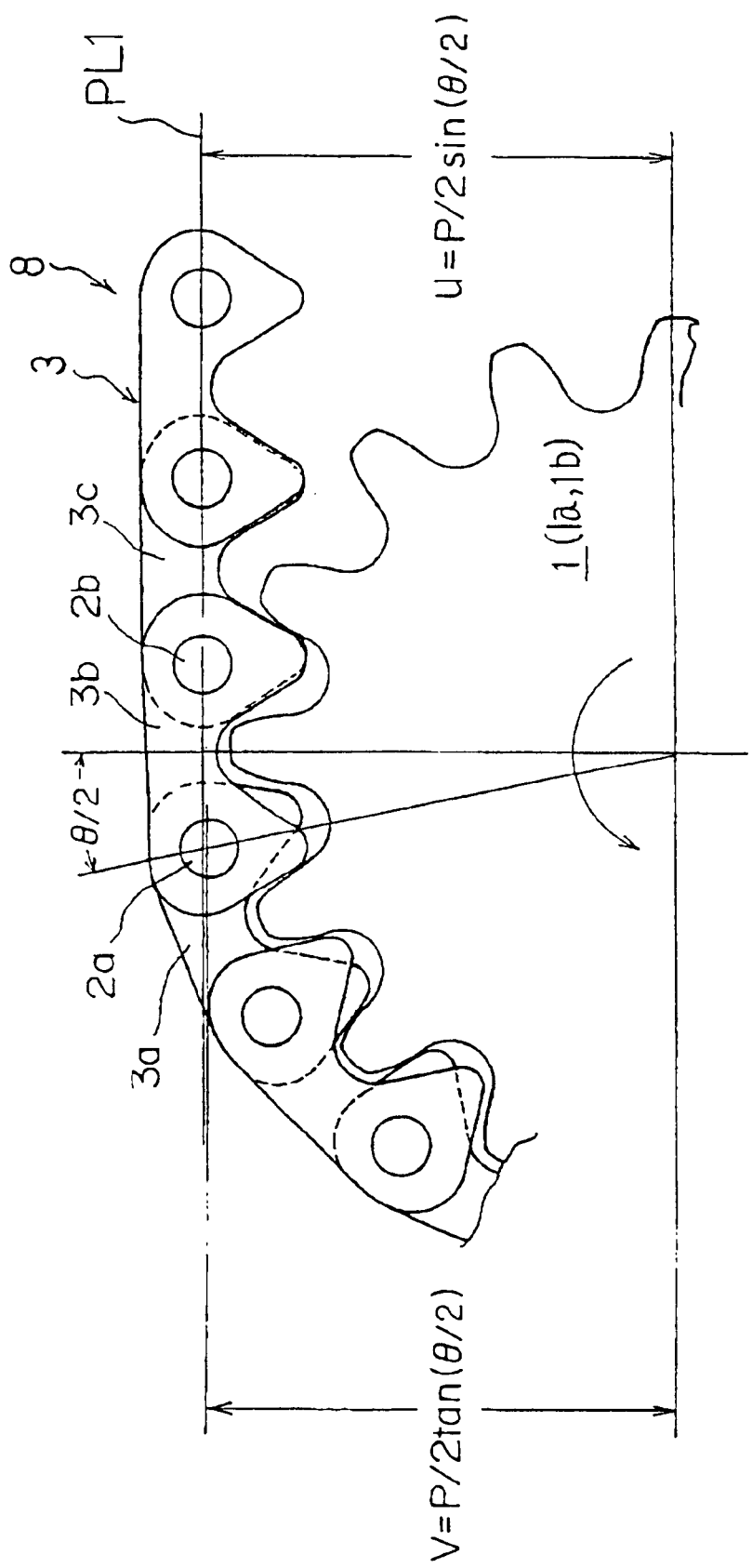
FIG. 4 schematically illustrates a meshing state in which the sprocket is rotated a half pitch angle ($\theta$/2) from the position of FIG. 3.
Figure 11:
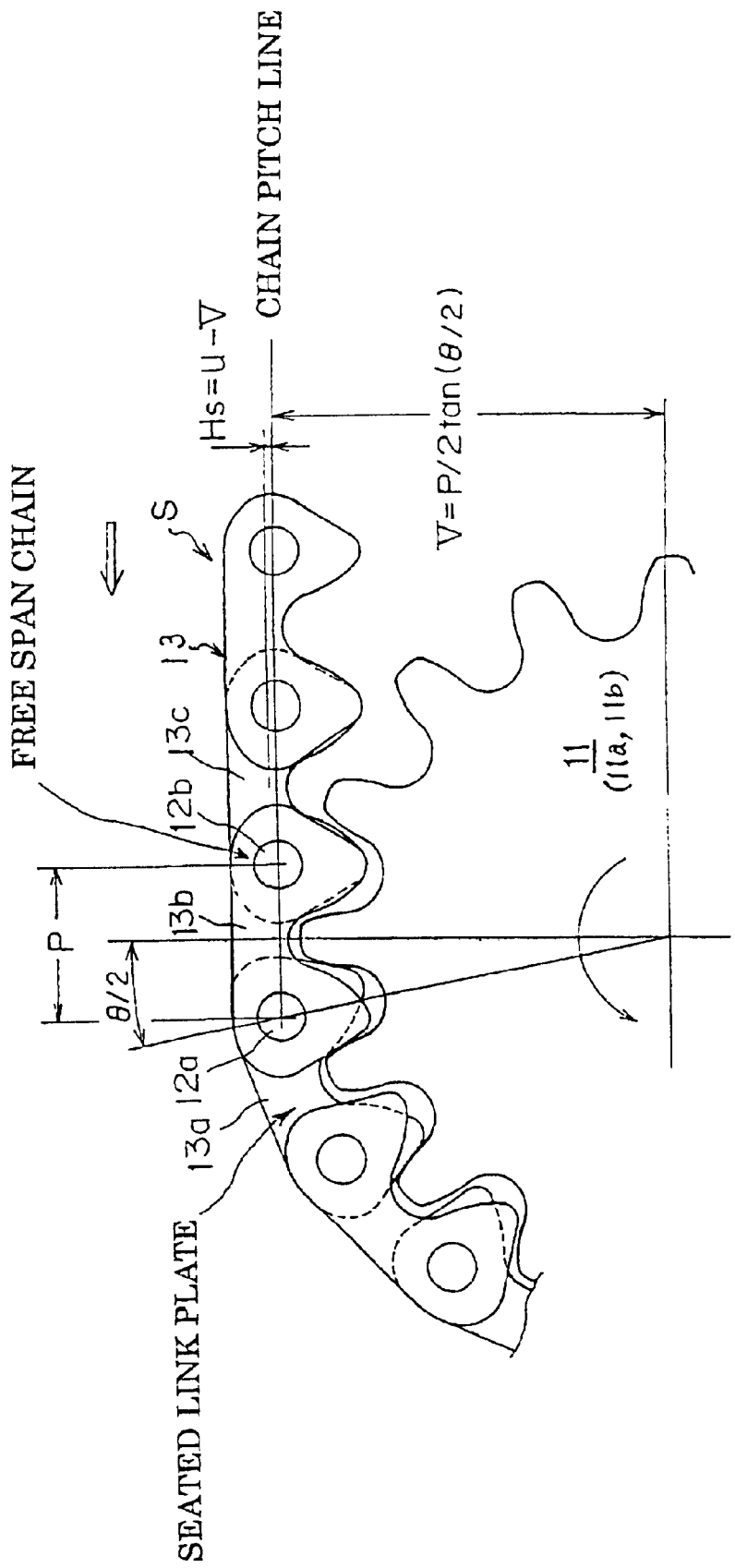
FIG. 11 is a schematic illustration of a meshing state in which the conventional sprocket is rotated a half pitch angle ($\theta$/2) from the position of FIG. 10.

Reference is made next to FIG. 4 illustrating how the silent chain 8 meshes with the sprocket 1 after the silent chain advanced a half pitch and the sprocket 1 turned a half pitch angle θ/2. The link plate 3a is engaged at its opposite outside flanks with the sprocket 1 and seated on the latter as in the conventional arrangement of FIG. 11. Thus, the distance from the center of the sprocket 1 to the pin 2a is expressed by $$V = P/2 \tan(\theta/2).$$

Link plate 3c meshes at its advance-direction-side inside flank with the sprocket 1, whilst the inside flank pitch line is Hc=Hf+Hs. This makes the meshing height V larger by Hs than in the case of the conventional chain shown in FIG. 11. Consequently, the distance from the center of the sprocket 1 to the pin 2b is expressed by $$U = P/2 \sin(\theta/2).$$

Turning back to FIG. 3, this means that the height to the link plate 3c is kept constantly at U during a period from the start of meshing of the inside flank of the link plate 3c with the sprocket 1 until advancement of the pin 2b to a position where the pin 2a was.

At that time, the inside flank of the link plate 3b separates from the sprocket 1 due to the winding or bending action of the chain about the pin 2a, whilst the outside flank of the link plate 3b is kept out of contact with the sprocket 1. Accordingly, the link plate 3b is supported by the pins 2a, 2b and smoothly brought into fuller meshing engagement with the sprocket 1.

Consequently, the free span chain is constantly kept at the height of U throughout the course of engagement of the silent chain 8 with the sprocket 1 and hence does not make up and down movements upon the polygonal motion of the chain.

In the silent chain drive mechanism, the tooth flank configurations of the camshaft sprockets 1a and the crankshaft sprocket 1b are formed by involute curves arranged to satisfy the expression: A1>Ac≧A2. Accordingly, even though the number of teeth of camshaft sprockets 1a is twice the number of teeth of the crankshaft sprocket 1b, the silent chain 8 starts meshing with the camshaft sprockets 1a and the crankshaft sprocket 1b such that the inside flank of a link plate immediately before the free span chain meshes with the sprocket concurrently with the outside flank of the preceding link plate being seated on the sprocket to thereby lift up the free span chain to a level at which the polygonal motion of the chain does not occur. Thus, the chordal action of the silent chain is suppressed at both the crankshaft sprocket and the camshaft sprockets.

Figure 7:
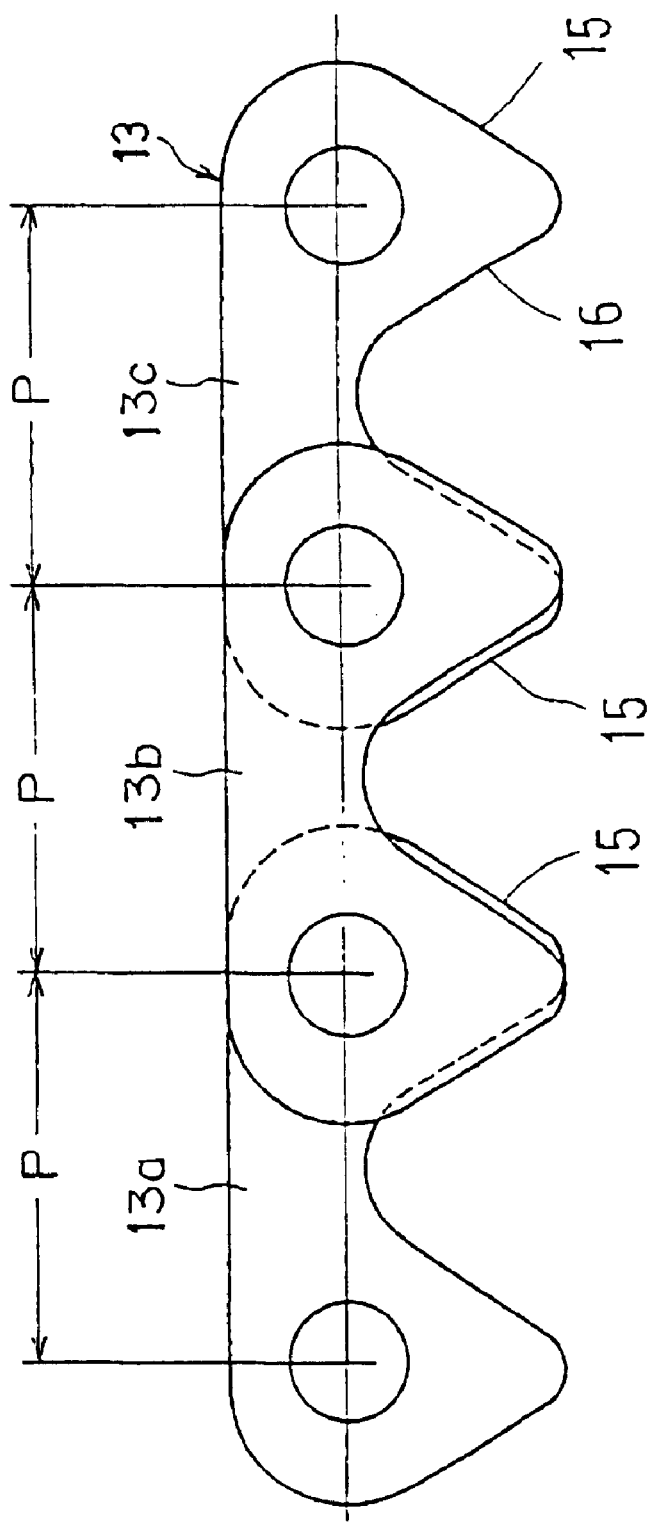
FIG. 7 schematically illustrates how a silent chain employed in the conventional silent chain drive mechanism is arranged.
Figure 8:
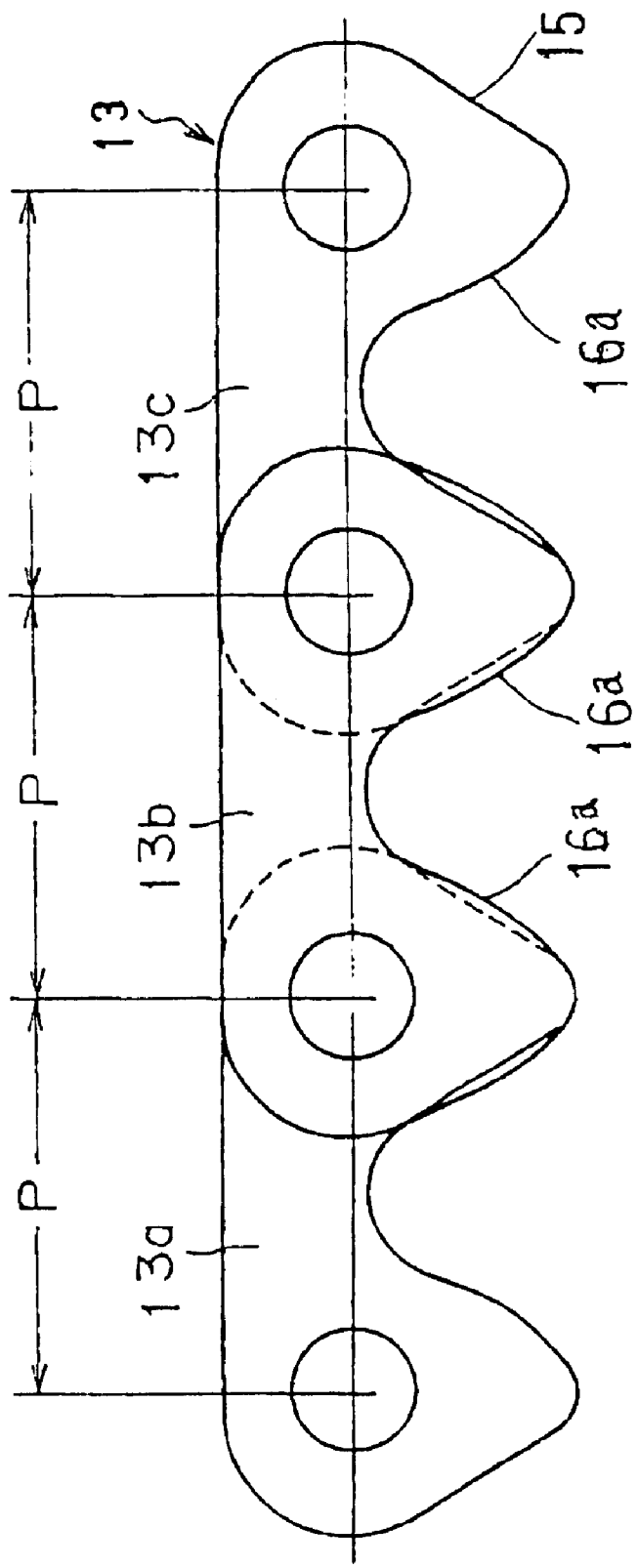
FIG. 8 schematically illustrates how a different silent chain employed in the conventional silent chain drive mechanism is arranged.

Unlike the conventional silent chain drive mechanism comprising the link plates and the sprockets having the relation of A1≦A2 as explained in relation to FIG. 7 or FIG. 8, the silent chain drive mechanism of the embodiment described above is designed so that at both the crankshaft sprocket side and the camshaft sprocket side, the distance from the center of the sprocket to the free span chain is kept at a constant value of U throughout the course of meshing of the link plate immediately before the free span chain, that is, from the start of meshing until seating on the sprocket of that link plate, thereby preventing the silent chain from making a chordal action. This leads to the further advantage that vibrations and noises accompanied by the chordal action of the silent chain can be alleviated, and the changes in the chain tension can be suppressed, thereby improving the driving performance and durability.

Advantageous effects attained by the silent chain drive mechanism of the present invention are as follows.

Since the inside flanks of the link plate teeth are profiled to satisfy the expression Hc=Hf+Hs, the chordal action as occurred with the polygonal motion of the conventional silent chain can be suppressed at any point of meshing engagement between the silent chain and the sprockets. This leads to considerable reductions in vibrations and noises caused by the chordal action. Further, the silent chain drive mechanism is able to achieve improved driving performance free from the changes of the chain tension.

Furthermore, the tooth flank configurations of the larger sprocket and the smaller sprocket are formed by involute curves arranged to satisfy the expression A1>Ac≧A2. Accordingly, even if the number of teeth of the larger sprocket is twice the number of teeth of the smaller sprocket, the chordal action of the chain can be diminished at both the larger sprocket side and the smaller sprocket side. This may add to the reduction of vibrations and noises accompanied with the chordal action. Further, it is possible to maintain the durability of the silent chain and good driving performance at both the smaller sprocket side and the larger sprocket side.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain drive mechanism comprising:

a larger sprocket having a plurality of spaced teeth;

a smaller sprocket having a plurality of spaced teeth smaller in number than the teeth of the larger sprocket; and a silent chain wound around the larger sprocket and the smaller sprocket for transmitting power therebetween, the silent chain comprising a plurality of link plates interconnected by connector pins, each link plate having a pair of teeth;

the link plate teeth having inside and outside flanks profiled to satisfy the expression $$Hc=Hf+Hs$$

where Hc is the distance from the chain pitch line to the inside flank pitch line, Hf is the distance from the chain pitch line to the outside flank pitch line, the chain pitch line being an imaginary line passing though the centers of the connector pins, the inside flank pitch line being an imaginary line parallel to the chain pitch line and intersecting the inside flanks at points where the distance between adjacent inside flanks is ½ the chain pitch, and the outside flank pitch line being an imaginary line parallel to the chain pitch line and intersecting the outside flanks at points where the distance between adjacent outside flanks is 3/2 of the chain pitch, and Hs is defined by the equation $$H_s = \frac{P}{2}\left(\frac{1}{\sin\left(\frac{\theta}{2}\right)} - \frac{1}{\tan\left(\frac{\theta}{2}\right)}\right)$$

where P is the chain pitch measured on the chain pitch line between centers of successive connector pins, and θ is an angle greater than the angular pitch of the teeth of the larger sprocket but not exceeding the angular pitch of the teeth of the smaller sprocket, the larger and smaller sprockets having tooth flanks having an involute curve profile satisfying the expression $$A1>Ac\geq A2$$

where A1 is the pressure angle of the larger sprocket, A2 is the pressure angle of the smaller sprocket, and Ac is the pressure angle of the inside flanks of the link plate teeth of the silent chain, whereby, as the chain meshes with either of said sprockets, the inside flank of a link plate adjacent to the free span of the chain approaching the last-mentioned sprocket, and the outside flank of a preceding seated link plate seated on the last-mentioned sprocket, concurrently mesh with the same sprocket tooth, thereby keeping the free span of the chain substantially free of up and down movement due to polygonal motion of the chain.

2. A silent chain drive mechanism according to claim 1, wherein the virtual sprocket has a pressure angle equal to the pressure angle of the inside flanks of the link plate teeth.

3. A silent chain drive mechanism according to claim 1, wherein the outside and inside flanks of the link plate teeth have a rectilinear profile.

4. A silent chain drive mechanism according to claim 3, wherein the virtual sprocket has a pressure angle equal to the pressure angle of the inside flanks of the link plate teeth.

* * * * *